US009798188B2

(12) United States Patent
Li et al.

(10) Patent No.: US 9,798,188 B2
(45) Date of Patent: Oct. 24, 2017

(54) DETECTING ACCESSORIES OF A LIQUID CRYSTAL PANEL

(71) Applicant: Shenzhen China Star Optoelectronics Technology Co., Ltd., Shenzhen, Guangdong (CN)

(72) Inventors: Quan Li, Guangdong (CN); Yujun Xiao, Guangdong (CN); Guofu Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 191 days.

(21) Appl. No.: 14/784,131

(22) PCT Filed: Aug. 21, 2015

(86) PCT No.: PCT/CN2015/087779
§ 371 (c)(1),
(2) Date: Oct. 13, 2015

(87) PCT Pub. No.: WO2017/016010
PCT Pub. Date: Feb. 2, 2017

(65) Prior Publication Data
US 2017/0153501 A1 Jun. 1, 2017

(30) Foreign Application Priority Data
Jul. 29, 2015 (CN) .......................... 2015 1 0456496

(51) Int. Cl.
G02F 1/133 (2006.01)
G02F 1/1335 (2006.01)

(52) U.S. Cl.
CPC .. *G02F 1/133608* (2013.01); *G02F 1/133606* (2013.01)

(58) Field of Classification Search
CPC .................... G02F 1/133606; G02F 1/133608
See application file for complete search history.

(56) References Cited

U.S. PATENT DOCUMENTS 6,353,466 B1 * 3/2002 Park ........................ B65H 7/20
324/750.25
6,759,867 B2 * 7/2004 Sohn ..................... G09G 3/006
324/750.25

(Continued)

*Primary Examiner* — Timothy L Rude
(74) *Attorney, Agent, or Firm* — Andrew C. Cheng

(57) ABSTRACT

The disclosure provides a detecting accessories of a liquid crystal panel. The detecting accessories comprises a backlight module and two adjusting plates. The backlight module comprises a bottom plate, an edge frame surrounding the bottom plate, a backlight source assembled on the bottom plate, and a diffusion plate disposed opposite to the bottom plate, and the diffusion plate covers the edge frame. Each adjusting plate comprises a carrying section and an assembling section. The two adjusting plates are disposed adjacent with each other. The assembling sections of each adjusting plates are detachably assembled on one side of the edge frame away from the bottom plate. The light of the backlight source emits outward through the diffusion plate. The carrying sections of the two adjusting plates are configured for shading an edge of the diffusion plate for changing an emitting area of the diffusion plate.

10 Claims, 1 Drawing Sheet

(56) References Cited

U.S. PATENT DOCUMENTS

| | | | | |
|---|---|---|---|---|
| 7,439,757 B2* | 10/2008 | Kang | ................... | G02F 1/1303 |
| | | | | 324/760.01 |
| 7,525,303 B2* | 4/2009 | Wang | ................... | G01R 31/01 |
| | | | | 324/750.25 |
| 7,800,568 B2* | 9/2010 | Kang | ................... | G02F 1/1303 |
| | | | | 324/750.26 |

* cited by examiner

DETECTING ACCESSORIES OF A LIQUID CRYSTAL PANEL

CROSS REFERENCE

This application claims the benefit of Chinese Patent Application No. 201510456496.8, filed Jul. 29, 2015, titled "Detecting accessories of a liquid crystal panel", the entire contents of which are incorporated by reference herein in its entirety.

FIELD OF THE INVENTION

The disclosure is related to the field of liquid crystal display, and more particularly, to a detecting accessories of a liquid crystal panel.

BACKGROUND OF THE INVENTION

Currently, liquid crystal display devices are widely used in display units of electronic devices, and backlight modules are important units in liquid crystal display devices for providing necessary light sources and achieve the functions of liquid crystal panels. For liquid crystal panels, when assembling during manufacturing processes or before selling, functions of liquid crystal panels should be examined, and display functions of liquid crystal panels can be activated only after being assembled with backlight modules during most examinations; different manufactured liquid crystal panels have different sizes. Backlight module jigs used during examination are solely designed according to different sizes, i.e. a certain size of backlight module jig should be designed for each size of backlight modules, such that backlight module jigs do not involve versatility, need much resources and the cost is high.

SUMMARY OF THE INVENTION

The disclosure provides a detecting accessories of a liquid crystal panel having versatility.

In order to achieve the above purposes, the disclosure provides the following technical solutions:

The disclosure provides a detecting accessories of a liquid crystal panel. The detecting accessories comprises a backlight module and two adjusting plates. The backlight module comprises a bottom plate, an edge frame surrounding the bottom plate, a backlight source assembled on the bottom plate, and a diffusion plate disposed opposite to the bottom plate, and the diffusion plate covers the edge frame. Each adjusting plate comprises a carrying section and an assembling section. The two adjusting plates are disposed adjacent with each other. The assembling sections of each adjusting plates are detachably assembled on one side of the edge frame away from the bottom plate. The light of the backlight source emits outward through the diffusion plate. The carrying sections of the two adjusting plates are configured for shading an edge of the diffusion plate for changing an emitting area of the diffusion plate.

Wherein the adjusting plates are made of aluminum.

Wherein the edge frame is rectangular, the edge frame comprises two lateral frames disposed opposite to each other and an end frame connected with the two lateral frames, one of the two adjusting plates is assembled at one of the lateral frames, and the other adjusting plate is assembled at the end frame.

Wherein the edge frame is stripe, the assembling sections of the adjusting plates are fixed on the surface of the edge frame away from the bottom plate by screws or buckles.

Wherein the backlight module further comprises a middle frame, the middle frame is detachably assembled on the surface of the edge frame away from the bottom plate, the end of the diffusion plate is fixed between the edge frame and the middle frame, and the adjusting plates are assembled at the middle frame.

Wherein the edge frame is stripe, the assembling sections of the adjusting plates are connected with the middle frame by screws or buckles.

Wherein a cushion pad is disposed between the middle frame and the assembling sections.

Wherein a protective pad is disposed between the middle frame and the diffusion plate.

Wherein the assembling sections of the adjusting plates have adjusting positions disposed with intervals toward the direction of the carrying sections, and the edge frame can be fixed with different adjusting positions.

Wherein an optical film sheet is disposed on an emitting surface of the diffusion plate.

According to the disclosure, the detecting accessories of a liquid crystal panel have adjusting plates which can adjust the size of the emitting area, such that different sizes of liquid crystal panels can be examined with the same backlight module, the versatility of the backlight module is improved, the materials are saves and the preparing cost is lowered.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF THE DRAWINGS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
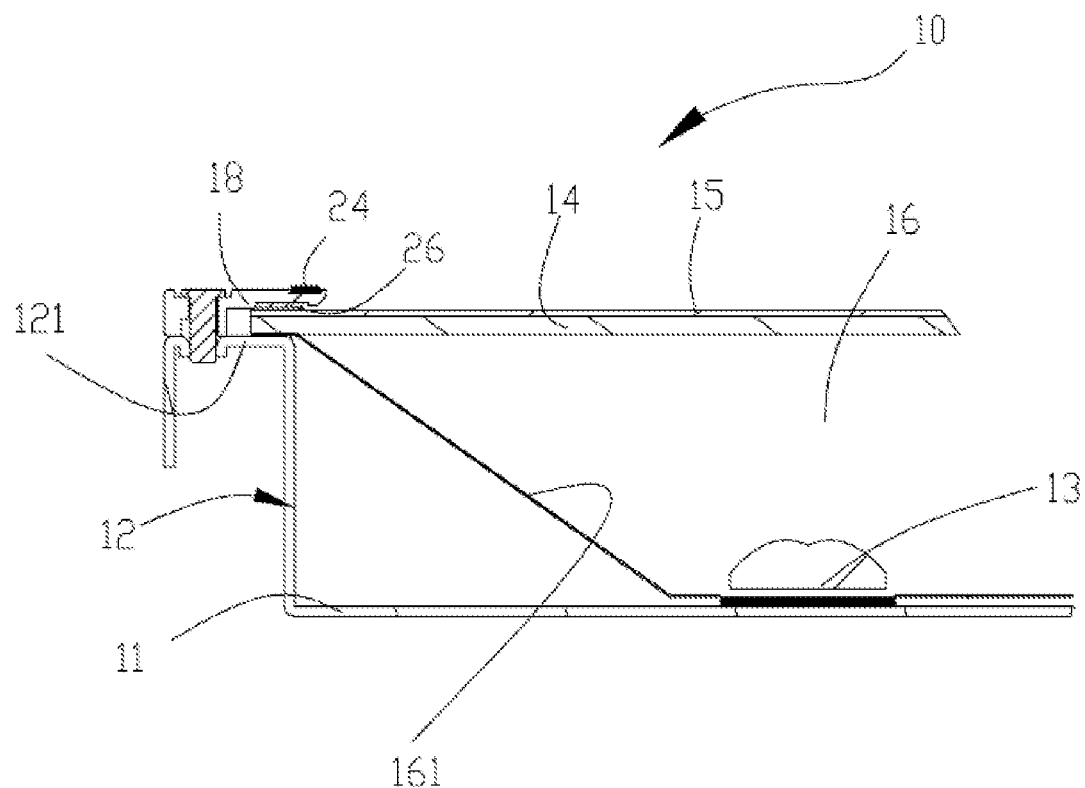
FIG. 1 is a sectional view of the backlight module of the detecting accessories of a liquid crystal panel without adjusting plates according to a preferred embodiment of the disclosure.
Figure 2:
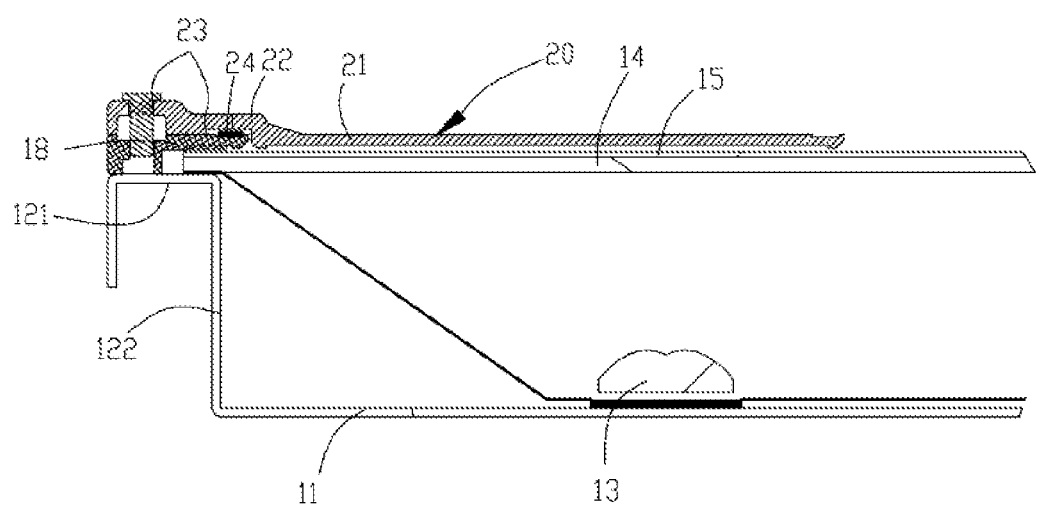
FIG. 2 is a sectional view of the detecting accessories of a liquid crystal panel according to the embodiment of the disclosure.

Referring to FIGS. 1 and 2, according to a preferred embodiment of the disclosure, a detecting accessories of a liquid crystal panel is provided. The detecting accessories is configured for providing a backlight source for the liquid crystal panel and supporting the examination of the display properties of the liquid crystal panels. The detecting accessories comprises a backlight module 10 and two adjusting plates 20. The backlight module 10 comprises a bottom plate 11, an edge frame 12 surrounding the bottom plate 11, a backlight source 13 assembled on the bottom plate 11, and a diffusion plate 14 disposed opposite to the bottom plate 11, and the diffusion plate 14 covers the edge frame 11. Each adjusting plate 20 comprises a carrying section 21 and an assembling section 22. The two adjusting plates 20 are disposed adjacent with each other. The assembling sections 22 of each adjusting plates 20 are detachably assembled on one side of the edge frame 12 away from the bottom plate 11. The light of the backlight source 13 emits outward through the diffusion plate 14. The carrying sections 21 of the two adjusting plates 20 are configured for shading an edge of the diffusion plate 14 for changing an emitting area of the diffusion plate 14.

Further, the adjusting plates 20 are made of aluminum. The adjusting plates 20 are made by an extrusion process. The assembling sections 22 of the adjusting plates 20 have adjusting positions 23 disposed with intervals toward the direction of the carrying sections 21, i.e. the adjusting positions 23 are disposed along the direction of the width. The size of the adjusting positions 23 can be designed according to the size of the liquid crystal panel. The edge frame 12 can be fixed with different adjusting positions 23. In this embodiment, the backlight module is an examined backlight module. Different adjusting positions 23 indicate different emitting areas formed at the backlight module by the adjusting plates 20; when an adjusting position is closer to the carrying sections 21, the emitting area formed by the adjusting plate 20 would become smaller. The size of the emitting surface of the backlight module is the greatest size of the display panel in the field of displays, i.e. the size of the emitting section corresponding to the diffusion plate, such that the adjusting plate 20 would form an emitting section, which has a size smaller than the emitting surface, and it can further be adjusted to the size of display panels being examined.

Further, an optical film sheet 15 is disposed on an emitting surface of the diffusion plate 14 for improving the light efficiency.

In this embodiment, the backlight module is a point light. The bottom plate 11 is a rectangular plate used as a back plate of the backlight module. In this embodiment, the edge frame 12 and the bottom plate 11 are integrally formed. The bottom plate 11 and the edge frame 12 form an accommodating chamber 16, the accommodating chamber 16 is enclosed by the diffusion plate 14, the backlight source 13 is disposed on a bottom plate in the accommodating chamber 16, and a reflective sheet is disposed at an inner edge of the accommodating chamber.

In this embodiment, the edge frame 12 is rectangular and is disposed at the peripheral of the bottom plate 11. The edge frame 12 comprises two lateral frames 122 disposed opposite to each other and an end frame (not shown in the figures) connected with the two lateral frames 122. Extending edges 121 are disposed at the two lateral frames 122 and the edges which are away from the bottom plate 11 of the end frame as well as extend outward. The surface is the lateral surface of the edge frame 12 away from the bottom plate 11. Wherein the length of the lateral frame is longer than the length of the end frame, i.e. are the long side and the short side of the backlight module.

According to an embodiment of the disclosure, the adjusting plates 20 are stripe sheets. The backlight module further comprises a middle frame 18. The middle frame 18 is detachably assembled on the surface of the edge frame 12 away from the bottom plate 11, the end of the diffusion plate 14 is fixed between the edge frame 12 and the middle frame 18, and the adjusting plates 20 are assembled at the middle frame 18.

Specifically, the middle frame 18 is a stripe piece made by extruding aluminum, and the assembling sections 22 of the adjusting plates 10 are connected with the middle frame 18 by screws or buckles. Preferably, the middle frame 18, the edge frame 12 and the assembling sections 22 are connected by screws. The two adjusting plates 20, the lateral frames of the edge frame 12, which are assembled with adjusting plates, and the end frame surround the diffusion plate 14 and form an emitting section having a smaller area, such that it can be used for examination of backlight of the liquid crystal panels having the size of the section. Take a 40 inch liquid crystal panel as an example, when the size of the emitting section corresponding to the diffusion plate of the backlight module 10 is 50 inch, the adjusting positions at the adjusting plates 20 corresponding to 40 inch are fixed with the edge frame 12 by screws. The two adjusting plates 20 are disposed at the length direction and the width direction of the diffusion plate 14 of the backlight module, such that the emitting surface surrounded as an emitting section corresponding to a 40 inch liquid crystal panel.

Further, a cushion pad 24 is disposed between the middle frame 18 and the assembling sections 24. The cushion pad 24 is configured for preventing the liquid crystal panel being scratched.

Further, a protective pad 26 is disposed between the middle frame 18 and the diffusion plate 14. The protective pad 26 is configured for preventing the middle frame 18 scratching the diffusion plate 14.

According to another embodiment of the disclosure, the differences are that one of the two adjusting plates 20 is assembled at the extending edge 121 of one of the lateral frame 122, and another adjusting plate is assembled at the extending edge of the end frame; further, the two adjusting plates 20, the lateral frames of the edge frame 12, which are assembled with adjusting plates, and the end frame surround the diffusion plate 14 and form an emitting section having a smaller area, such that it can be used for examination of backlight of the liquid crystal panels having the size of the section. The liquid crystal panel is fixed to the adjusting plates 20 and the edge frame 12 by adhesives or locking means for examining its functions. The assembling sections 21 of the adjusting plates 20 are fixed on the surface of the edge frame away from the bottom plate 11 by screws or buckles.

It can be understood that when the liquid crystal panel and the adjusting plates are fixed by screws, antifriction pads should be disposed between the liquid crystal panel and the adjusting plates for preventing the liquid crystal panel being scratched.

According to the disclosure, the detecting accessories of a liquid crystal panel have adjusting plates which can adjust the size of the emitting area, such that different sizes of liquid crystal panels can be examined with the said backlight module, the versatility of the backlight module is improved, the materials are saves and the preparing cost is lowered.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A detecting accessories of a liquid crystal panel, comprising:
   a backlight module, comprising:
      a bottom plate;
      an edge frame, surrounding the bottom plate;

a backlight source, assembled on the bottom plate; and
a diffusion plate, disposed opposite to the bottom plate, and the diffusion plate covering the edge frame; and
two adjusting plates, each adjusting plate comprising:
a carrying section; and
an assembling section;
the two adjusting plates are disposed adjacent with each other, the assembling sections of each adjusting plates are detachably assembled on one side of the edge frame away from the bottom plate;
wherein, the light of the backlight source emits outward through the diffusion plate, the carrying sections of the two adjusting plates are configured for shading an edge of the diffusion plate for changing an emitting area of the diffusion plate.

2. The detecting accessories of a liquid crystal panel according to claim 1, wherein the adjusting plates are made of aluminum.

3. The detecting accessories of a liquid crystal panel according to claim 2, wherein the edge frame is rectangular, the edge frame comprises two lateral frames disposed opposite to each other and an end frame connected with the two lateral frames, one of the two adjusting plates is assembled at one of the lateral frames, and the other adjusting plate is assembled at the end frame.

4. The detecting accessories of a liquid crystal panel according to claim 2, wherein the edge frame is stripe, the assembling sections of the adjusting plates are fixed on the surface of the edge frame away from the bottom plate by screws or buckles.

5. The detecting accessories of a liquid crystal panel according to claim 2, wherein the backlight module further comprises a middle frame, the middle frame is detachably assembled on the surface of the edge frame away from the bottom plate, the end of the diffusion plate is fixed between the edge frame and the middle frame, and the adjusting plates are assembled at the middle frame.

6. The detecting accessories of a liquid crystal panel according to claim 5, wherein the edge frame is stripe, the assembling sections of the adjusting plates are connected with the middle frame by screws or buckles.

7. The detecting accessories of a liquid crystal panel according to claim 5, wherein a cushion pad is disposed between the middle frame and the assembling sections.

8. The detecting accessories of a liquid crystal panel according to claim 5, wherein a protective pad is disposed between the middle frame and the diffusion plate.

9. The detecting accessories of a liquid crystal panel according to claim 1, wherein the assembling sections of the adjusting plates have adjusting positions disposed with intervals toward the direction of the carrying sections, and the edge frame can be fixed with different adjusting positions.

10. The detecting accessories of a liquid crystal panel according to claim 1, wherein an optical film sheet is disposed on an emitting surface of the diffusion plate.

* * * * *